United States Patent [19]
Klassen

[11] Patent Number: 6,161,919
[45] Date of Patent: Dec. 19, 2000

[54] INK COVERAGE REDUCTION METHOD FOR PRINTERS CAPABLE OF PRINTING MULTIPLE DROP SIZES

[75] Inventor: R. Victor Klassen, Webster, N.Y.

[73] Assignee: Xerox Corporation, Stamford, Conn.

[21] Appl. No.: 09/253,941

[22] Filed: Feb. 22, 1999

[51] Int. Cl.[7] .................................. B41J 2/21; B41J 2/47
[52] U.S. Cl. .............................. 347/43; 347/251; 358/1.9
[58] Field of Search .................................. 347/15, 43, 40, 347/251; 358/462, 530, 448

[56] References Cited

U.S. PATENT DOCUMENTS

| | | | |
|---|---|---|---|
| 4,631,548 | 12/1986 | Milbrandt | 347/43 |
| 4,930,018 | 5/1990 | Chan et al. | 358/298 |
| 4,999,646 | 3/1991 | Trask | 347/41 |
| 5,237,344 | 8/1993 | Tasaki et al. | 347/9 |
| 5,412,410 | 5/1995 | Rezanka | 347/15 |
| 5,515,479 | 5/1996 | Klassen | 358/1.9 |
| 5,519,815 | 5/1996 | Klassen | 358/1.9 |
| 5,563,985 | 10/1996 | Klassen et al. | 358/1.9 |
| 5,621,546 | 4/1997 | Klassen et al. | 358/536 |
| 5,631,748 | 5/1997 | Harrington | 358/502 |
| 5,635,967 | 6/1997 | Klassen | 347/43 |
| 5,642,142 | 6/1997 | Bohorquez | 347/15 |
| 5,649,071 | 7/1997 | Klassen et al. | 358/1.9 |
| 5,790,152 | 8/1998 | Harrington | 347/48 |

*Primary Examiner*—Thinh Nguyen
*Attorney, Agent, or Firm*—Oliff & Berridge, PLC

[57] ABSTRACT

A method for processing a color image for printing to reduce an amount of marking material used therefor, includes: providing a printer capable of printing multiple dot sizes at any given print pixel, the multiple dot sizes including at least a large dot size and a small dot size smaller than the large dot size; determining if marking material for multiple colors of the color image are to be printed at the print pixel; and printing the color image with a combination of the large dot size and the small dot size, wherein either of the large dot size and the small dot size is printed at the print pixel if only a single color is printed at the pixel, and at least one of the small dot size is printed at the print pixel if more than one color is printed at the pixel.

36 Claims, 7 Drawing Sheets

INK COVERAGE REDUCTION METHOD FOR PRINTERS CAPABLE OF PRINTING MULTIPLE DROP SIZES

BACKGROUND OF THE INVENTION

1. Field of Invention

This invention relates to an image processing method for reducing the amount of marking material required to print a colored image, to avoid problems common to the use of excessive amounts of ink. In particular, this invention relates to an image processing method in which the multiple ink drop sizes are restricted and adjusted so as to maintain a total ink level within desired limits, while retaining the printed image color substantially unchanged and providing a high quality printed image.

2. Description of Related Art

Full color printing has become a desired goal of office, as well as home, products. One type of full color printer that has significant potential for fulfilling such a goal is the ink jet printer, due primarily to its low purchase and operating costs combined with its high quality output. In one common design of such printers, a reservoir of liquid ink is connected to an ink output orifice via a capillary tube. In the tube, a heater element is provided, responsive to an on/off or binary printing signal. When printing is required and a printing signal is directed to the heater element, the heater element rapidly heats ink in the capillary tube adjacent thereto to a gaseous state, producing a pressure differential that expels a droplet of ink from the orifice, directing the droplet to a sheet of receiving material, such as paper. Color printing is accomplished by providing multiple layers or separations of ink on the page. Commonly, colors are provided by subtractive combinations of cyan, magenta and yellow inks. To print black, a combination of equal amounts of cyan, magenta and yellow is printed, or a fourth black ink is used as a substitute. Undercolor removal, a well known process in the printing arts, can be used to print a single layer of black ink as a substitute for the combination of equal amounts of cyan, magenta and yellow. For a fuller discussion of under color removal and its application to electronically derived or created images, reference is made to J.A.C. Yule, Principles of Color Reproduction, (John Wiley & Sons, Inc., New York, 1967), pages 294–327. Other full color printing processes may use dry powder or liquid toners.

A problem of ink jet printers is that the liquid inks used have a finite drying time, which tends to be somewhat longer than desirable. Further, the drying time of any particular area is at least partly a function of the amount of ink deposited on that area. That is, as the amount of ink deposited in a given area increases, the drying time of the ink in that area also generally increases. While satisfactory drying times are possible with black-only or single separation printing, once multiple separations are required, the large amount of liquid on the page causes the problems of ink puddling or pooling, bleeding to adjacent image areas, and flow through to the back side of the receiving material. Paper cockle is also a problem due to saturation of the paper receiving material and subsequent rapid drying. Particularly, problems are noted in the printed image at high ink coverage areas, and high coverage areas where high contrast image edges occur. While certain materials variations, such as selection of different inks or the use of special papers, may resolve some of these problems, each brings its own distinct problems to the process. While special treated papers optimized for ink jet use are possible, plain papers are preferred from cost and convenience standpoints.

Using one available set of materials, a maximum ink coverage of about 150% is required for printing without artifacts resulting from too much ink. As used herein, ink coverage refers to the number of ON pixels in a region for all the separations, divided by the total number of pixels in the region in one separation. Without undercolor removal, a typical full color image may require ink coverage in the range of 200–300%. With undercolor removal, maximum ink coverage may be down to 200%, but no lower. Additionally, it would be highly desirable for the process to operate irrespective of image content, or on the separation binary bitmaps without further image information.

While ink jet printing has a notable problem with the case of high ink coverage, other printing processes that are printed on a pixel by pixel basis also have problems with excessive marking material. Notably, electrophotographic printing methods using a pixel by pixel printing process for forming a latent image for development by dry or liquid toner marking materials, can suffer from excessive marking material, evidenced by sheet cockling, and curling caused by differential shrinkage of toner and paper in the printing process.

U.S. Pat. No. 4,930,018 to Chan et al. teaches the reduction of paper cockle and graininess of ink jet prints. Printing of a given scan line occurs multiple times, with three different dye loadings, with pixels requiring the highest dye loading printed on one pass, pixels requiring an intermediate dye loading printed on another pass, and pixels requiring the lowest dye loading on another pass. The method takes as input continuous tone RGB (red-green-blue) images and performs RGB-CMYK (cyan-magenta-yellow key or black) conversion with full under color removal. As understood, printing is performed at half resolution, so that "pixels" in the input image correspond to 2×2 blocks in the output image. The image data is first error diffused from 8 bits per pixel per separation to 4 bits per pixel per separation. Then, for each pixel, a count of up to 4 drops of each dye loading is computed, for each separation. There are multiple choices, ranked in order of total ink coverage. If the highest coverage choice exceeds the maximum allowable coverage, the separation with highest coverage is changed to use a lower coverage value for the same gray level, if possible. If it is not possible to stay at the same gray level, the gray level for that separation is dropped by one, and the error passed on to neighbors. The process iterates until the total ink coverage is as low as required. Pixels within the 2×2 block are assigned values (0 or 1) by proceeding around the block in clockwise order, and filling in pixels in order. First, the high dye load pixels are turned on, then the medium, then the low. Within each dye loading group, first black is turned on, until there are no more black pixels of that dye loading, then the next pixels in the cycle are turned on, until there are no more cyan required, then magenta, and yellow, and then the next dye load group. By maximizing ink coverage and using multiple dye loadings, they reduce the noisiness of the image, and by maintaining the total ink coverage within known limits, they prevent the many problems associated with excessive ink.

U.S. Pat. No. 4,999,646 to Trask teaches limiting coverage to 100% coverage (by the above definition of coverage), or perhaps between 100 and 200% coverage (if 100% corresponds exactly to no white spaces on a page), owing to the circular shape and overlap of print dots. Coverage is limited by using 2×2 super pixels and assigning each one drop per pixel in a combination that depends on the color required. Assuming one bit per separation input with full undercolor removal, there are eight possible colors that could be requested (including white). In order to reduce patterning due to the multiple swaths, two passes are used, each of a checkerboard pattern of pixels (the two passes being offset to provide full coverage). The two pass process allows ink to dry between passes.

U.S. Pat. No. 5,237,344 to Tasaki et al. describe a method for reducing the amount of ink printed to 50%, 75% or 66%. The method uses fixed patterns of turn-off locations (e.g., a checkerboard for 50%) and selects the pattern based on the printing mode (reverse character mode, block graphic mode or normal character mode), the character selected, and possibly the relative humidity. Apparently, the method is designed for single color (black) printing: if it were used for multiple separation (e.g., red formed from yellow and magenta) printing, both separations would be turned off in the same place, resulting in more obvious patterns. The small set of fixed turn-off patterns makes the method very sensitive to line angle, as lines at some angles will have more pixels turned off than others. Also the method is only useful for characters from a built-in font, including graphic characters; arbitrary fonts and shapes, such as are requested in documents created using industry standard page description languages, such as PCL or PostScript, cannot be handled in this way.

Other methods for reducing marking material coverage have been developed, and have become generally known as color reduction techniques. In these techniques, an algorithm is generally used to turn OFF pixels in an image when printing at the pixel would result in excessive ink coverage. Thus while ink coverage is reduced on a pixel-by-pixel basis, the overall appearance of the image is not substantially degraded.

U.S. Pat. No. 5,515,479 to Klassen, the entire disclosure of which is incorporated herein by reference, discloses a color reduction method for processing images for printing. The method includes the steps of, for each separation, making a pixel level determination of marking material coverage, based on the number of pixels within a given area that are turned on. If a determination is made that too much marking material will be placed within the given area, a fraction of pixels in the area are turned off to reduce the amount of marking material that will be used for the given area. The method uses a processing order through each given area to prevent artifacts from occurring in the pixel reduction step, which tends to randomize the turn off effect. Additionally, in the disclosed method, the results of the determination are compared for each separation, to determine that the turnoff result allows at least one corresponding pixel among each of the separations to be turned on.

Other color reduction methods are also described in U.S. Pat. Nos. 5,649,071, 5,635,967, 5,563,985, and 5,519,815, the entire disclosures of which are incorporated herein by reference. U.S. Pat. No. 5,649,071 to Klassen et al. discloses a method of processing images preparatory to printing in a color printer adapted to printing serial color separations, that when superposed form the final color image. In the disclosed method, separation color images are received for printing defined by continuous tone separation signals, which are color corrected and halftoned preparatory to printing the color image. The received continuous tone separation image signals are used to derive an estimate of marking material coverage. The marking material coverage estimate is subsequently used in association with random number generation to turn OFF otherwise ON pixels in each separation as the separation is printed for the reduction of marking material coverage.

U.S. Pat. No. 5,635,967 to Klassen discloses a method and apparatus for reducing marking material coverage in reproduction of edges in a halftoned image. The method includes the steps of: a) detecting edges in the image using edge filtering; and b) reducing marking material coverage at the detected edges. Interseparation correlation may also be provided, for the purpose of ascertaining whether a detected edge is against a white or no colorant region, in which circumstance, marking material coverage is not reduced. The patent further describes the reduction of marking material coverage at the detected edges in proportion to the overall coverage in the image region, taking into account the kind of colors (primary or secondary) forming the edge.

U.S. Pat. No. 5,563,985 to Klassen et al. discloses a method for processing images for printing color reduced images. The method includes the steps, for each separation, of making a pixel level determination of marking material coverage, based on the number of pixels within a given area that are turned on. If a determination is made that too much marking material will be placed within the given area, a random number function is used to turn off a fraction of pixels in the area to reduce the amount of marking material that will be used for the given area. To prevent artifacts from occurring in the pixel reduction step, a processing order through each given area is used that tends to randomize the turn off effect. Additionally, the results of the determination are compared for each separation, to determine that the turnoff result allows at least one corresponding pixel among each of the separations to be turned ON.

Finally, U.S. Pat. No. 5,519,815 to Klassen discloses a method and device for processing color images preparatory to printing to effect color reduction. The method of reducing marking material coverage in text and line art areas of secondary colors includes the steps of: a) determining the locations of text and line art color pixels having excessive marking material coverage; b) upon determining the locations of color pixels having excessive marking material coverage, processing separation pixels to turn OFF a predetermined portion of the separation pixels corresponding to color pixels having excessive marking material coverage; and c) to prevent artifacts from occurring in the pixel reduction step, processing a given area of separation pixels in an order which tends to randomize the turn OFF effect.

Ink jet printers capable of printing multiple drop sizes are generally known in the art. For example, U.S. Pat. No. 5,412,410 to Rezanka discloses a thermal ink jet printhead, which has two or more groups of selectively activatable heating elements and associated nozzles within each group having the same geometric parameters, but the geometric parameters and nozzles between groups being different so that the ejection from the nozzles of different groups have different ink volumes. Although this patent discloses that the printhead can be used to provide higher quality images, such as grey scale printing and high resolution text printing, the patent does not teach or suggest using the different drop volume nozzles as a means for reducing marking material coverage.

SUMMARY OF THE INVENTION

Despite these various color reduction techniques, a need exists for improved color reduction processes that provide high quality printed images with little image degradation.

In this respect, the present inventor has discovered that by restricting the combinations of drop sizes permitted to be printed at a single pixel in a printer capable of generating multiple drop sizes, total ink levels can be kept within desired limits. The result is a reduced risk of inter-color bleed, flow-through, puddling and other problems related to the presence of excess ink.

A benefit of the present invention is that, because the restrictions only affect very heavily saturated colors, where there would be a thick layer of ink on the page, the loss in tonal variation is insignificant. Furthermore, in the less saturated colors, multiple drop sizes can be applied to full advantage to reduce graininess in halftone images.

The marking material reduction method of the present invention can be applied to ink jet printers, as well as to other printers that print an image on a pixel-by-pixel basis and that are capable of printing multiple dot sizes.

The present invention also provides a device for processing a color image, which device effects marking material reduction of the image.

The present invention still further provides a device and method for increasing the image quality of multilevel printing processes, such as grey-scale or associated color-scale printing, by increasing the color level printing latitude of the printer.

BRIEF DESCRIPTION OF THE DRAWINGS

These and other advantages and features of this invention will be apparent from the following, especially when considered with the accompanying drawings, in which.

DETAILED DESCRIPTION OF PREFERRED EMBODIMENTS

Figure 1:
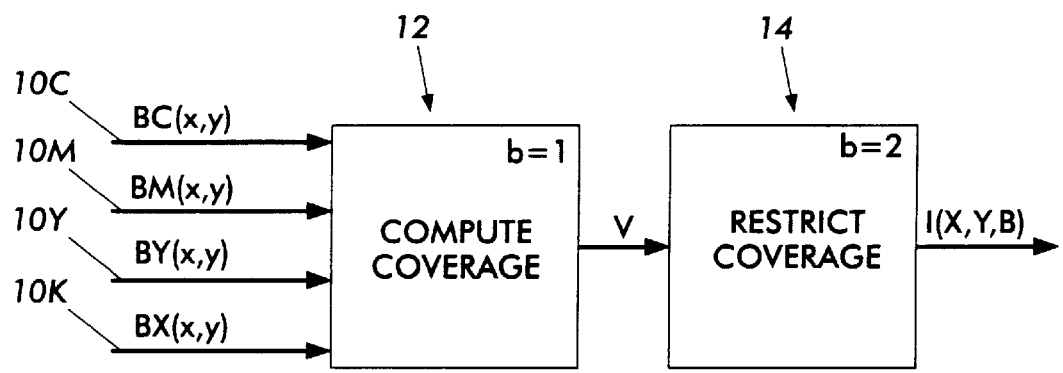
FIG. 1 is a functional block diagram of a system for carrying out the present invention.

A basic functional block diagram for a system for carrying out the present invention is shown in FIG. 1. As shown therein, a plurality of video inputs 10c, 10y, 10m, and 10k, each representing one of the cyan, magenta, yellow or black separations, respectively (B N (x,y)) of the initial image bitmap B(x,y) are directed into the ink coverage reduction system. Thus, in this description, the cyan bitmap is represented as B C (x,y), the magenta bitmap as B M (x,y), the yellow bitmap as B Y (x,y), and the black bitmap as B K (x,y). Each of the bitmaps B N (x,y) is a binary bitmap in this system, defined along the fast scan (x-axis) and slow scan (y-axis) axes, describing the image in terms of 1 bit pixels arrayed in scan lines. Each pixel is an image signal, which may be said to have a condition or image state, which describes for a binary pixel whether a print dot will be made at the output or not. This may also be equated to whether the pixel is ON or OFF, i.e., 1 or 0. Thus, there are two image states for any pixel in the initial bitmap image for a binary printer.

After the color reduction process, a final image bitmap I (x,y,b) is generated for each color separation, yielding final image bitmaps I C (x,y,b), I M (x,y,b), I Y (x,y,b), and I K (x,y,b) for the colors cyan, magenta, yellow, and black, respectively. However, rather than being a binary bitmap as was the initial bitmap B(x,y), where each pixel was represented by one bit, the final image bitmap I(x,y,b) will have at least two bits per pixel. That is, the value b, representing the number of bits per pixel, will be a positive integer of 2 or more. In embodiments where two bits per pixel are used, the first bit (b=1) could represent whether or not a dot will be printed in the pixel (i.e., whether the pixel for that respective color is ON or OFF) and the second bit (b=2) could represent a dot size to be printed in the pixel (e.g., a large dot is printed when the bit is in the ON state or a small dot is printed when the bit is in the OFF state), or vice versa.

In operation in embodiments of the present invention, it is likely that the input bitmap B (x,y) will in fact not be a binary bitmap as described above, but instead will be a bitmap having two or more bits per pixel. That is, rather than simply specifying whether a print pixel is ON or OFF, the input bitmap can itself specify both whether the pixel is ON or OFF, as well as specifying a dot size for that pixel. In such embodiments, although the input bitmap will already specify a desired dot size for each print pixel, the color reduction method of the present invention will override the input dot size values, such as by specifying that a small dot size be printed at a print pixel where a large dot size was initially specified.

For a multilevel printer, there may be more than two pixel values, and a similarly larger number of pixel image states. For example, according to the present invention, the final bitmap image resulting from the color reduction process will have more than two values, such as to denote a large printed dot, a small printed dot, or no printed dot (i.e., OFF).

In embodiments, the ink coverage reduction can be carried out on any number of pixels at the same time; however, for simplicity, the process is described here based on processing one pixel at a time. The first step in the process is the computation of ink coverage at each pixel, illustrated in FIG. 1 as computation block 12. Here, the total number of ON bits for the respective color separations are added together, giving a number v.

Of course, where the input bitmap B(x,y) specifies varying dot sizes in addition to specifying whether a print pixel is ON or OFF, the computation block 12 can, and preferably does, calculate the number v as a weighted number. That is, the number v can be calculated to more accurately represent the ink coverage amount based on the relative drop sizes. For example, if the small dot size represents half the volume of ink as a large dot size, then it is preferred that the number v be incremented half as much for a small ON pixel as for a large ON pixel. Of course, other weighting systems can be readily determined and applied by those of ordinary skill in the art based on the present disclosure.

The next step is restriction block 14. Here, the respective pixel values and pixel print data sizes (if specified in the input bitmap) of the different color separations are either passed unchanged, if no color reduction is needed, or the dot sizes are decreased, if color reduction is needed. Thus, if the number of dots needed, v, is less than or equal to one, then the bitmap values B N (x,y) can be transferred directly to the image bitmap by setting I N (x,y,1) to ON and I N (x,y,2) to the desired dot size. If the input bitmap already specifies a desired print dot size, and if v is less than or equal to one, then the originally specified dot size is passed unchanged from the input bitmap to the image bitmap by setting I N (x,y,2) to the input bitmap dot size. However, if the number of dots needed, v, is greater than one, indicating that color reduction is needed, the bitmap values B N (x,y) must be changed. Here, each of the respective image bitmap color separation pixels will still be indicated as ON, i.e., by setting I N (x,y,1) to ON. However, the dot sizes of one or more of the pixels will be reduced so as not to use the largest size dots for all of the needed dots. However, if the input bitmap already specifies a desired print dot size, and if v is greater than one, then the originally specified dot size is overridden by the restriction block 14, and the dot size from the input bitmap is reduced from the input bitmap to the image bitmap by setting I N (x,y,2) to the desired smaller dot size. Thus, if a bit value of 1 indicates a large size dot and a bit value of 0 indicates a small size dot, one or more of the respective pixel size bits I N (x,y,2) will be set to 0 rather than to 1. Thus, this operation ensures that where two or more dots are to be printed at a single pixel, not all of the dots will be printed as the largest available dot size.

In the above discussion, the color reduction process is carried out by comparing the value v to one. However, as will be readily apparent to those skilled in the art based on the present disclosure, the value v can be compared to other desired numbers to permit higher or lower color saturation. Thus, for example, if a higher color saturation of, for example, two large dots per pixel is acceptable, then the value v could be compared to two in determining whether smaller dot sizes should be substituted for larger dot sizes.

Thus, as is apparent from this discussion, the color reduction step can reduce the color by varying degrees, as needed. Thus, for example, in one embodiment of the present invention, the color reduction step can reduce the dot size of all of the necessary dots in print pixels where multiple dots are to be printed. Alternatively, in embodiments of the present invention where a lesser degree of color reduction is required, the color reduction step can reduce the dot size of some, but not all, of the necessary dots in print pixels where multiple dots are to be printed. Thus, for example, if three dots are to be printed in a given print pixel, the color reduction step can reduce the dot size of all three pixels, can reduce the drop size of two pixels while leaving one large, or can reduce the dot size of one pixel while leaving two large. The only requirement is that not all of the dots are maintained at the large dot size. In the case where not all of the dots are reduced in size, a counter must be maintained for all separations. The respective counters are decremented by some amount each time a given separation is reduced, and incremented (by a different amount) each time it is not. Then, when only some but not all separations are to be reduced, the separation with the largest counter value would be reduced first. Similarly, in areas of the image where only one dot is to be printed in a print pixel, any size dot can suitably be used so as to provide optimum print quality.

Despite these variations as described above, for ease of description, the following discussion will be directed to an embodiment of the present invention where all of the dots are reduced in size in print pixels where multiple dots are to be printed, and large dot sizes are used in print pixels where only a single dot is to be printed. Furthermore, the following discussion assumes that the input bitmap does not already specify one of several dot sizes. Instead, the input bitmap is treated as a binary bitmap, described above, where all of the ON pixels are printed at a large dot size. However, the present invention is by no means limited to such an embodiment.

Figure 2:
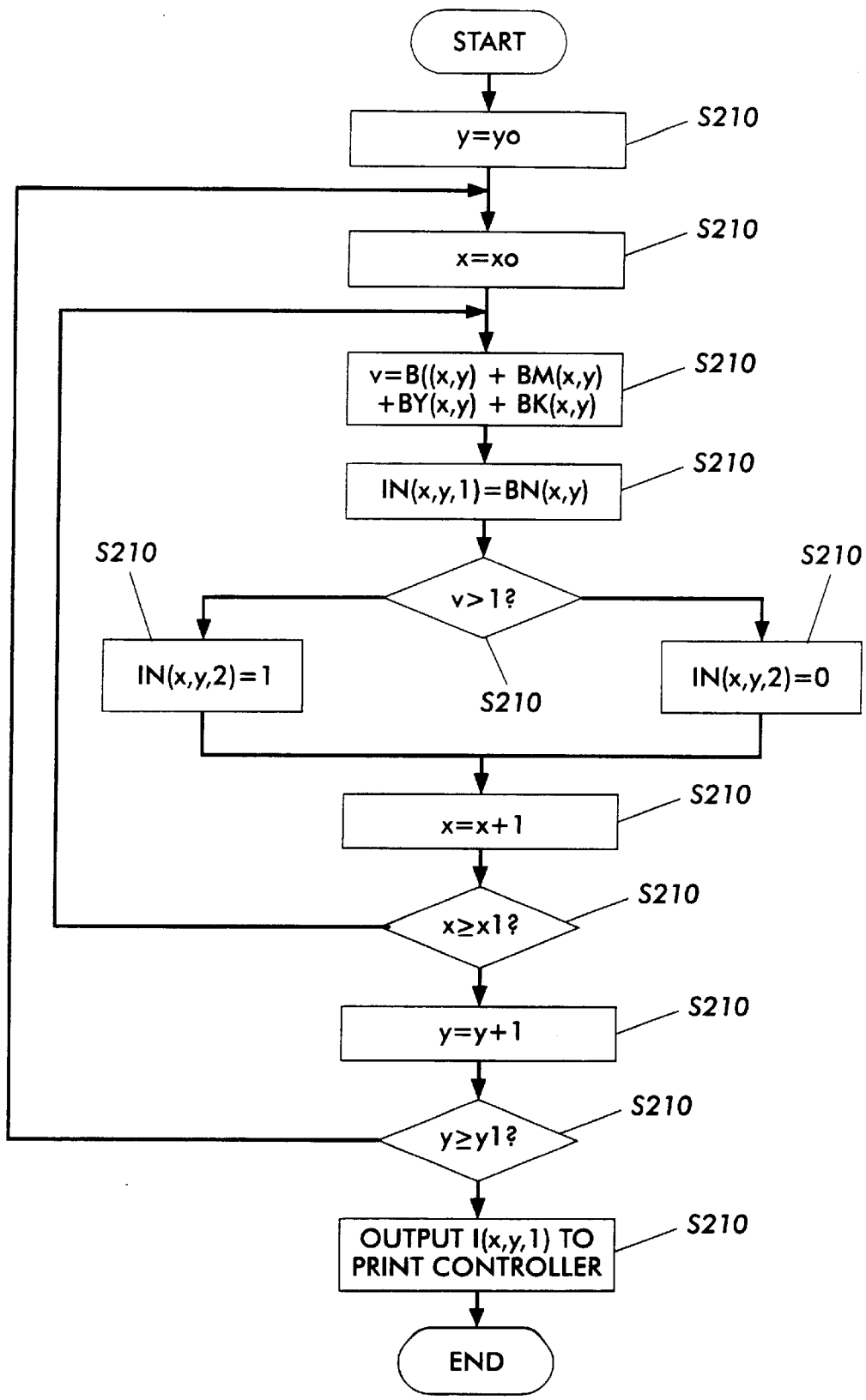
FIG. 2 shows a flow chart demonstrating the overall inventive method.

FIG. 2 is a flow chart showing the process steps in the described embodiment. In this embodiment, the print dots can have only two sizes, with a bit value of 1 representing a large sized dot and a bit value of 0 representing a small sized dot. The print area or bitmap B (x,y) is bounded by a coordinate system ranging from x0 to x1 on the x-axis, and from y0 to y1 on the y-axis.

In step S110, the y value for the bitmap is set to its starting value of y0. Similarly, in step S120, the x value for the bitmap is set to its starting value of x0. In step S130, the value v for total number of dots turned on for a given pixel in the bitmap B (x,y) is calculated, by summing the bit values of B N (x,y) for the four color separations. In step S140, the respective bit values in the image bitmap I N (x,y,1) are turned ON for the ON pixels of the original bitmap B N (x,y). Next, in step S150, the value v is compared to one to determine if any ink restriction is needed for the given pixel. If the value v is less than or equal to one, i.e., if only one color separation has the pixel marked as ON, then processing progresses to step S160. At step S160, the respective bit values in the image bitmap I N (x,y,2) representing the dot size are set to 1, i.e., are set to large size dots, for the ON pixels of the original bitmap B N (x,y). Back in step S150, if the value v is greater than one, i.e., if more than one color separation has the pixel marked as ON, then processing progresses to step S165 rather than step S160. At step S165, the respective bit values in the image bitmap I N (x,y,2) are set to 0, i.e., are set to small size dots to effect color reduction or ink coverage restriction, for the ON pixels of the original bitmap B N (x,y).

After steps S160 or S165, processing resumes at step S170, the value x is increased by one to proceed to the next pixel in line y of the bitmap. At step S180, x is compared to x1 to determine if the end of the line has been reached. If the end of the lines has not been reached, processing returns back to step S130; otherwise processing continues on to step S190. At step S190, the value y is increased by one to proceed to the next line of the bitmap. At step S200, y is compared to y1 to determine if the last line of the bitmap has been completed. If the last line has not been completed, processing returns back to step S120; otherwise processing continues on to step S210. At step S210, the resultant image bitmap I (x,y,b) is output to the print controller for printing.

Although not shown in these figures, additional steps can be included in the process to affect other aspects of the image. For example, additional pre-processing or post-processing steps can be included such as to effect traditional color conversion in the image, to incorporate masking logic, to incorporate half-toning patterns, and the like. Such additional processes are well-known to those skilled in the art, and their implementation into the present invention will be readily apparent based on the present disclosure.

Furthermore, the above embodiment of the present invention has been described as implementing the ink coverage reduction in the form of an image processing step. However, such ink coverage reduction could also be implemented electronically in a printer where the multiple color inks are ejected concurrently (or substantially so) into the same printed pixel location. In this embodiment, suitable control mechanisms could be incorporated into the printhead to forbid the ejection of multiple large drops into the same pixel, and instead forcing the ejection of multiple small drops into that pixel. Furthermore, as discussed above, the circuitry could be suitably altered so as to forbid the ejection of only large drops into the same pixel where multiple drops are to be formed, such that at least one small size drop is ejected rather than a large size drop.

Figure 3A:
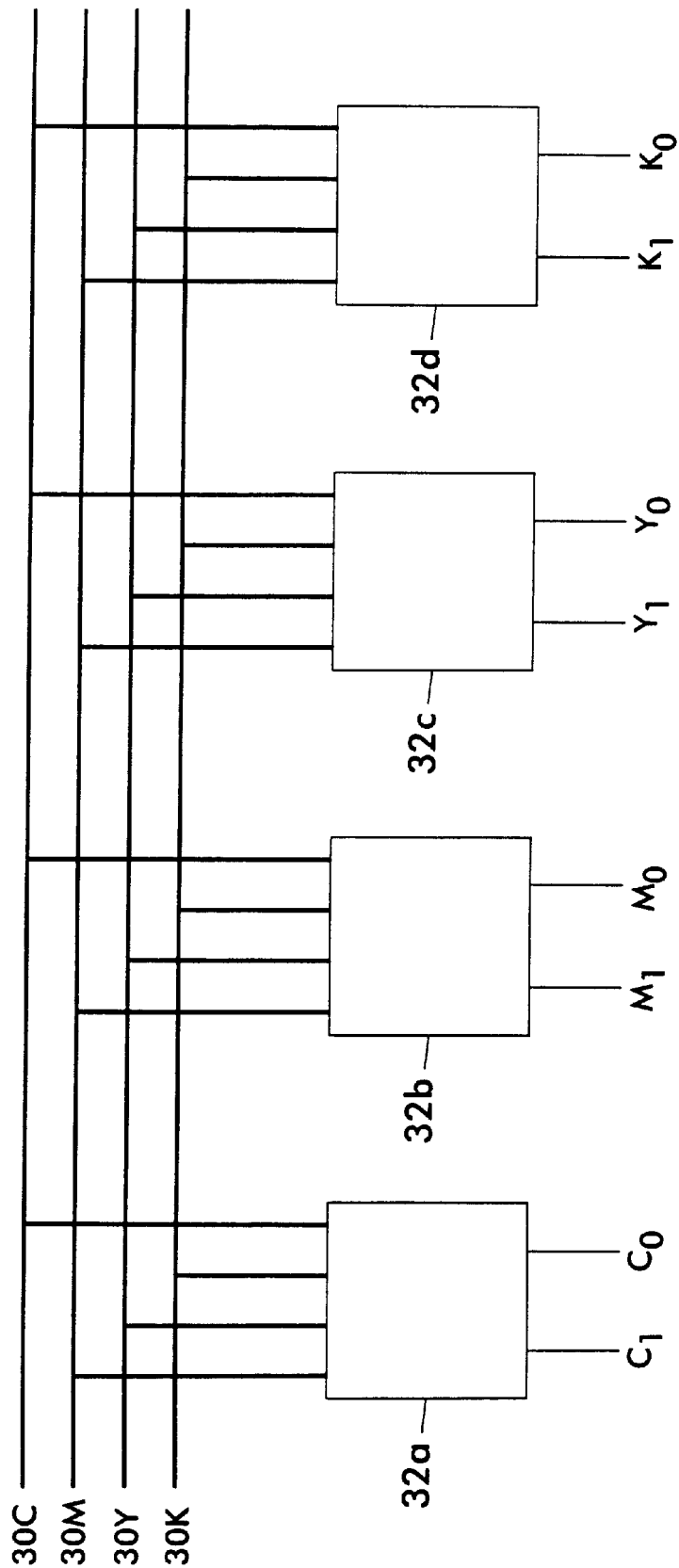
FIGS. 3a–3c show various means of electronically implementing the color reduction process of the present invention.
Figure 3B:
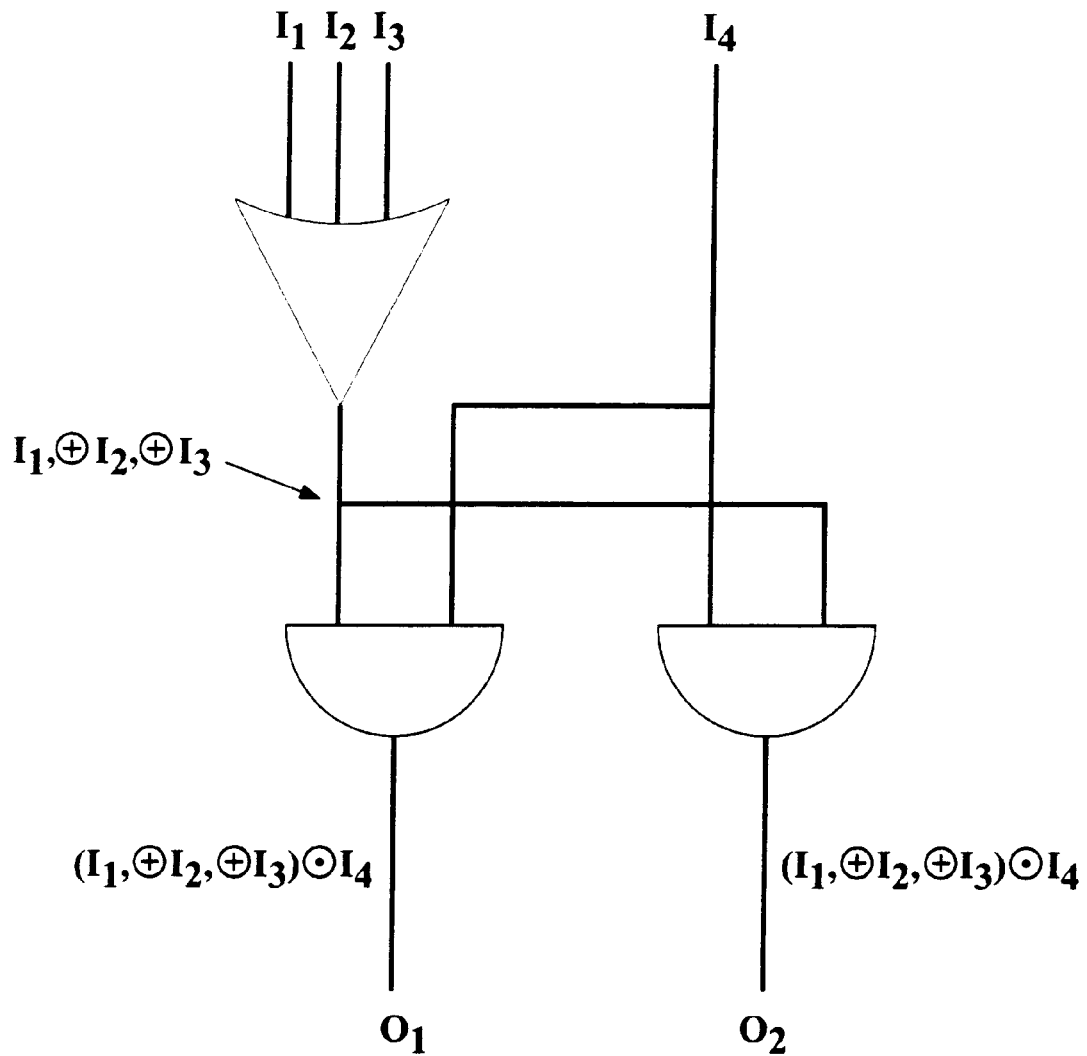

A sample electronic control method for implementing the ink coverage reduction method of the claimed invention is described in FIGS. 3a–3b. As shown in FIG. 3a, the input color lines 30 are processed electronically to determine if small or large size dots should be printed for the respective color separations. Input lines $30_C$, $30_M$, $30_Y$, and $30_K$ are attached to processing blocks $32_a$, $32_b$, $32_c$, and $32_d$. In each of the processing blocks 32, the rightmost input line corresponds to the output separation.

The processing blocks 32 are shown in more detail in FIG. 3b. In FIG. 3b, the three left input lines and the right input line, corresponding to the color separations, are shown as $I_1$, $I_2$, $I_3$, and $I_4$. In the processing block, the three left input lines are ORed together and the result is ANDed with the fourth input line to give the small drop signal, while the complement is ANDed with the fourth input line to give the large drop signal. Thus, in this embodiment, if the input is 1, and there is a 1 on at least one other separation, the output will be a small drop. Likewise, if the input is 1, and there is not a 1 on the other separations, the output will be a large drop. Finally, if the input is 0, the output will be no drop.

Figure 3C:
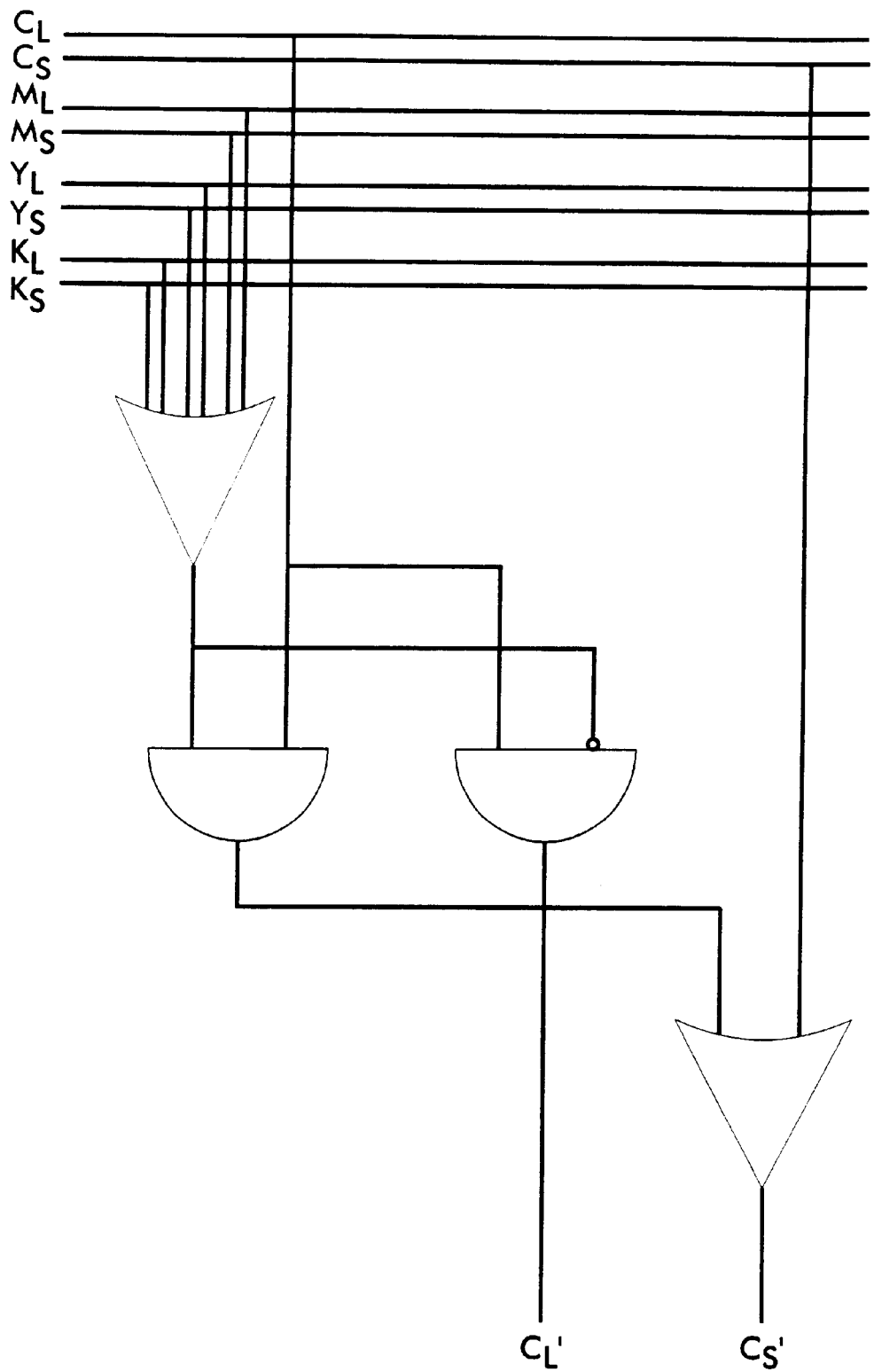

A variant of the embodiment of FIG. 3b is shown in FIG. 3c, for the cyan color separation. In the embodiment of FIG. 3c, the inputs are given as large and small dot sizes ($C_L$ and $C_S$, $M_L$ and $M_S$, $Y_L$ and $Y_S$, and $K_L$ and $K_S$) and the output is given as a large or small dot size (here, as $C_L'$ and $C_S'$). If any other drop appears in any other separation, as either a large or small drop, the large dot size is converted to a small dot size. Further, a small dot size is generated as output if it was converted from a large dot size or if it originally appeared as an input.

Other variations of this control method are of course possible, and will be readily apparent to those skilled in the art based on the present disclosure. Such other variations are also within the scope of the present invention.

A further advantage of the present invention, in printers capable of printing multiple drop sizes, is that at the same time that ink coverage is being reduced, significant improvements in color level can also be provided. That is, because the printer is capable of printing multiple drop sizes, much improved grey-scaling (in the case of black) or color leveling (in the case of color images) can be provided. Thus, in the case of grey-scaling, the different drop sizes assist in simulating varying shades of grey. Similarly, in color images, the different drop sizes, by varying them in conjunction with the color level and color of adjacent pixels, can provide significantly improved and smoother color level changes.

Figure 4:
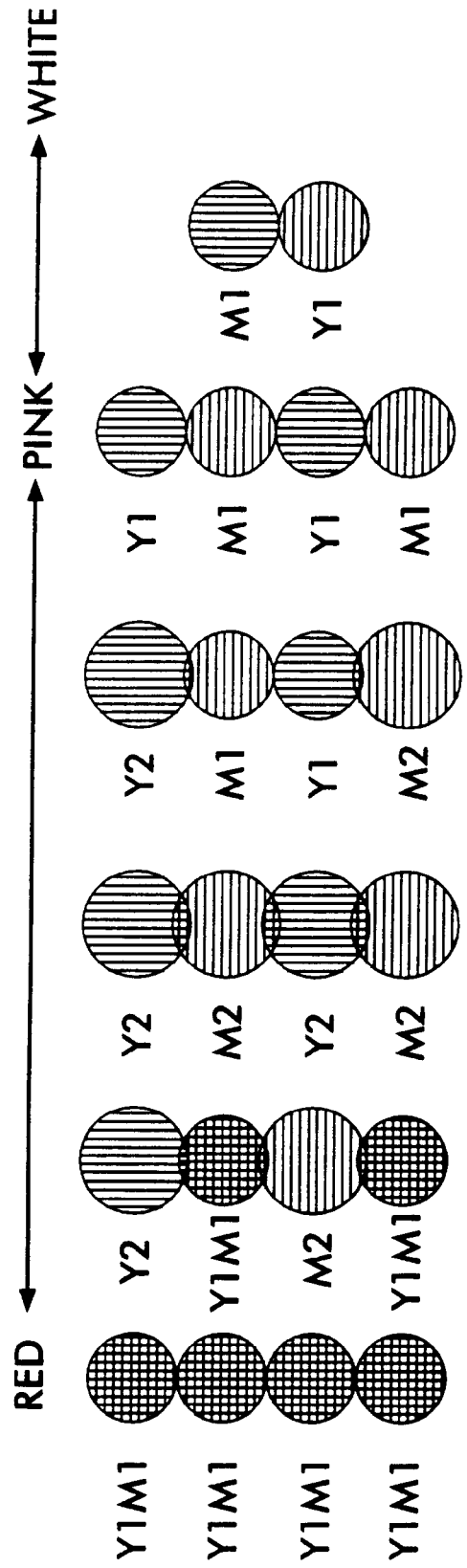
FIG. 4 shows a progression of levels of color from fully saturated to unsaturated according to the present invention.

For illustration only, FIG. 4 shows the progression of a color image, going from fully saturated red at the left, to fully unsaturated red (i.e., white) at the right. In this example, the possible color variations, due to the ability to print large and small drop sizes, range from a large drop (C2, M2, Y2, K2, for cyan, magenta, yellow and black, respectively), to a small drop (C1, M1, Y1, K1), to no drop at all (C0, M0, Y0, K0). Thus, for example, a red pixel could be formed by applying equal amounts of cyan and magenta ink, and could thus be formed as either C2M2 (large drops of cyan and magenta) or C1M1 (small drops of cyan and magenta). Of course, according to the present invention, ink coverage is reduced by suppressing the printing of all multiple large drops in a single pixel, so the cyan would be formed in the present invention as C1M1 (or C1M2 or C2M1), and no C2M2 pixels would be present.

The improved color level printing is performed preferably upon an image that has already been processed to form a halftoned bitmap image, or has otherwise been processed so that the bitmap contains information related to the relative color level of each pixel. For example, the color image can have been halftoned processed using Harrington's dispersive technique, such as disclosed in U.S. Pat. No. 5,631,748, the entire disclosure of which is incorporated herein by reference, or using the Klassen/Eschbach/Bharat vector error diffusion technique such as disclosed in U.S. Pat. No. 5,621,546, the entire disclosure of which is incorporated herein by reference. Of course, any other suitable halftoning or other processing method can be used.

Once the image has been halftoned, the respective pixels can be manipulated to adjust their respective ink drop sizes. According to the halftoning techniques, color level can be progressively varied from saturated to unsaturated according to the following table:

| Color | Printer with Two Drop Sizes | Printer with One Drop Size |
| --- | --- | --- |
| Fully Saturated Red | Y1M1 | Y2M2 |
|  | Y1M1, Y2, or M2 |  |
|  | Y2 or M2 | Y2 or M2 in all pixels |
|  | Y2, Y1, M2, or M1 |  |
| Pink | Y1 or M1 in all pixels |  |
|  | Y1 or M1 in some pixels | Y2 or M2 in some pixels |
| White | No pixels | No pixels |

As is apparent from the above table, the present invention provides significantly improved level control, by providing at least seven variations based on color and drop size. In comparison, a printer capable of printing only one drop size has only four levels, one of which (Y2M2) has high marking material coverage, which can lead to print quality defects as described above.

Furthermore, although the present invention has been described with reference to specific embodiments in which the printer is capable of printing only two different size dots, the invention is by no means limited to such embodiments. Although from an engineering standpoint complexity of the printer increases as more drop sizes are added, the principles of the present invention apply equally to two-size printers as well as to higher-size printers. In embodiments, it is preferred that the printer be capable of printing either 2 to 4 different sized dots. One of ordinary skill in the art, based on the description of the present specification, will readily be able to adapt the above embodiment to such other printers.

Furthermore, in embodiments of the present invention, it is preferred that the two different drop sizes be sufficiently different as to provide a distinctly different appearance on the printing medium. That is, it is preferred that the smaller dot be of a substantially different size from the larger dot. Thus, for example, it is preferred in embodiments of the present invention that the smaller dot have a diameter of from about 25 to about 85% of the diameter of the larger dot, more preferably from about 40 to about 75%, and most preferably from about 50 to about 60%. Furthermore, in embodiments of the present invention, it is preferred that the small dot have a diameter slightly larger than ½ the diameter of the large dot, such that two small dots printed in the same pixel will be slightly darker than one large dot printed in the same pixel. This relationship ensures that ink coverage reduction is achieved without sacrificing image darkness and quality.

Suitable printers capable of implementing the present invention are generally known in the art. For example, the above-described U.S. Pat. No. 5,412,410 to Rezanka, the entire disclosure of which is incorporated herein by reference, discloses a thermal ink jet printhead capable of printing multiple drop sizes by ejecting droplets of ink having different ink volumes. Another suitable printer is disclosed in U.S. Pat. No. 5,790,152, the entire disclosure of which is incorporated herein by reference. However, the present invention is not limited to such printers, and can be implemented equally as well in any currently available or after-developed printers.

Figure 5:
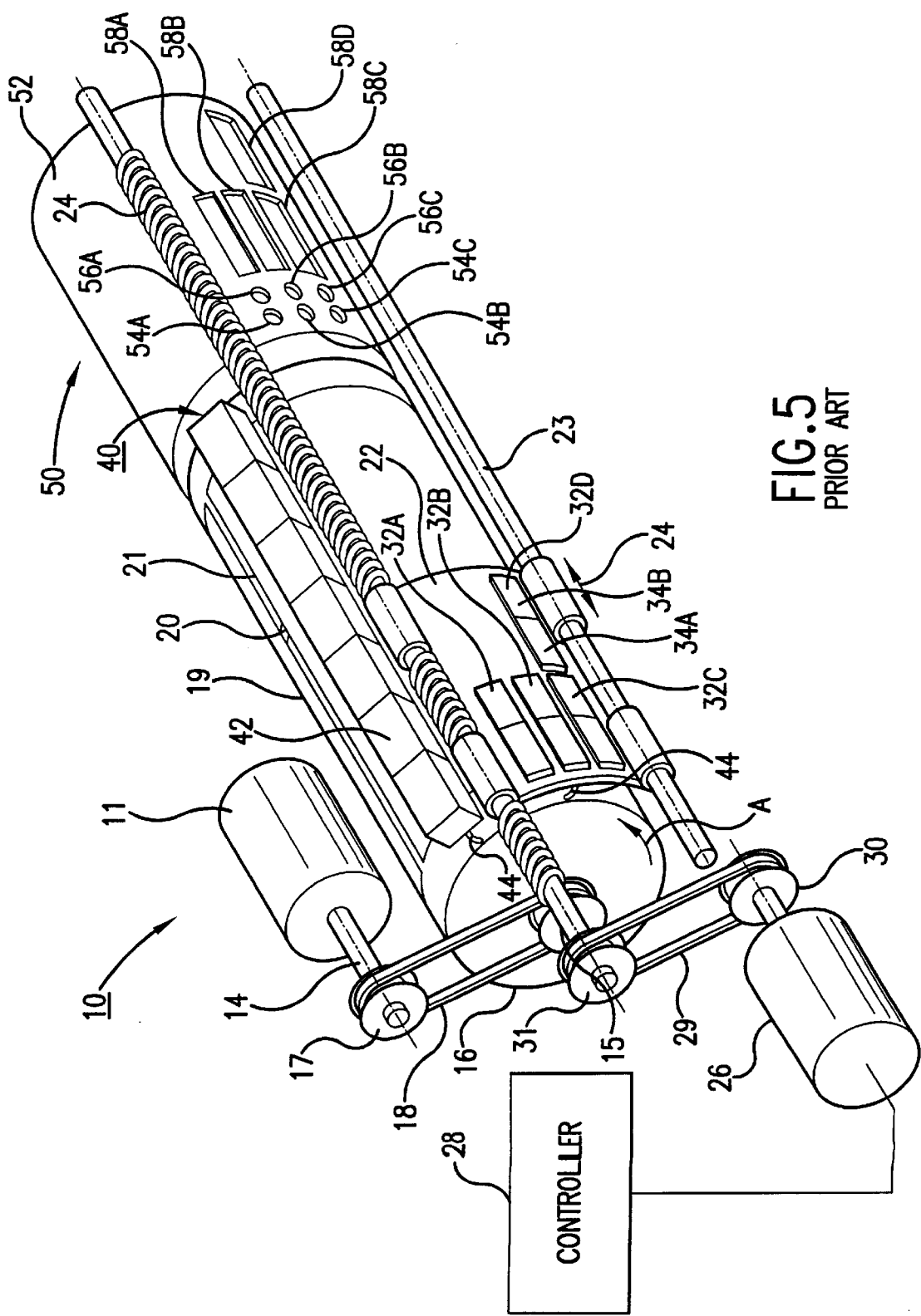
FIG. 5 illustrates a partial perspective view of an exemplary liquid ink printer having a plurality of partial width array printheads and a pagewidth printbar for ink jet printing.

For example, FIG. 5 illustrates components of a printing apparatus, generally designated 10, in which the outside covers or case and associated supporting components of the printing apparatus are omitted for clarity. The printing apparatus 10 includes a motor 11 connected to a suitable power supply (not shown) and arranged with an output shaft 14 parallel to an axis 15 of a cylindrical drum 16, which is supported for rotation on bearings (not shown). A pulley 17 permits direct engagement of the output shaft 14, to a drive belt 18 for enabling the drum 16 to be driven by the motor 11 in the direction of an arrow A.

A recording medium 19, such as a sheet of paper or a transparency, is placed over an outer surface 20 of the drum 16, with a leading edge 21 attached to the surface 20 before printing. As the drum 16 rotates, the sheet of paper 19 is moved past a printhead carriage 22 supported by a lead screw 24 arranged with the axis thereof parallel to the axis 15 of the drum 16 and supported by fixed bearings (not shown), which enable the carriage 22 to slidably translate axially. A carriage rail 23 provides further support for the carriage as the carriage moves in the direction of arrow 24 perpendicular to the moving direction of the sheet 21. A second motor 26, such as a stepper motor or other positioning mechanism, controlled by a controller 28, drives the lead screw with a second belt 29 connecting a clutch 30 and a clutch 31 attached to the lead screw 24 for movement thereof.

The printhead carriage 22 advances partial width array printbars 32A, 32B, 32C, and 32D in the direction of arrow 24 for printing on the sheet 21. Each individual printbar 32A–32D includes a first printhead die 34A and a second printhead die 34B butted together and mounted on a substrate (not shown). Each of the printhead dies 34A and 34B include nozzles, which are fired sequentially in banks of nozzles. All of the printhead die are fired in parallel for one full printing of all the partial width arrays 32 on the carriage 22.

In addition to the partial width arrays 32, the printer 10 includes a full-width array or pagewidth printbar 40 supported by an appropriate support structure (not shown) above the drum 16 for printing on the recording medium 21. The pagewidth printbar 40 has a length sufficient to print across the entire width (or length) of the recording medium during a single pass of the recording medium beneath the printbar. The printbar 40 includes a plurality of printhead subunits 42 affixed to a supporting substrate (not shown) in an abutted fashion.

While the present invention is demonstrated with the above embodiment, there is no doubt many others that accomplish the present invention. The important aspects of the invention are that ink coverage can be reduced, without degrading the image quality, by preventing the printing of all multiple large ink droplets, and instead printing either multiple small ink droplets or a combination of multiple large ink droplets and multiple small ink droplets. This method thereby reduces the amount of ink deposited on the print medium, without degrading the image quality.

The present description also applies equally in a binary or bilevel ink jet printer, as in a gray or other multilevel printer, where ink coverage is a function not only of the presence of a print dot, but also the gray level value of the print dot. In fact, in such gray or multilevel printers, the present invention provides increased control over the color level and resultant image quality increases, as described above.

Still further, other printing processes that are printed on a pixel by pixel basis also have problems with excessive marking material, and may benefit from the described method of reduced marking material use. Notably, electrophotographic and ionographic printing methods using a pixel by pixel printing process for forming a latent image for development with dry or liquid toner marking materials, can suffer from excessive marking material, evidenced by sheet cockling and curling caused by differential shrinkage of toner and paper in the printing process. Thus, although the present invention has been described with reference to an ink jet printing system, there is no reason that the present invention can not be applied to such other printing processes, and application of the present invention in such non-ink jet printing processes is fully within the scope of the present invention.

As will be apparent to one of ordinary skill in the art, numerous changes, alterations and adjustments can be made to the above-described embodiments without departing from the scope of the invention, and the invention is in no way limited to the specific exemplary embodiments described above. One skilled in the art will recognize that the various aspects of the invention discussed above may be selected and adjusted as necessary to achieve specific results for a particular printer application. Thus, the foregoing embodiments are intended to illustrate and not limit the present invention. It will be apparent that various modifications can be made without departing from the spirit and scope of the invention.

What is claimed is:

1. A method for processing a color image for printing to reduce an amount of marking material used therefor, comprising:

providing a printer for printing multiple dot sizes at any given print pixel, said multiple dot sizes comprising at least a large dot size and a small dot size smaller than said large dot size;

determining if marking material for multiple colors of said color image are to be printed at said print pixel; and printing said color image with a combination of said large dot size and said small dot size, wherein either of said large dot size and said small dot size is printed at said print pixel if only a single color is printed at said pixel, and at least one of said small dot size is printed at said print pixel if more than one color is printed at said pixel, wherein said color image is comprised of multiple color separations each defined by a bitmap of multiple bit pixels each having a pixel value and arranged in an array of scan lines, wherein said multiple bit pixels comprise a first bit pixel defining an ON or OFF state of the pixel and a second bit pixel defining a printed dot size of the pixel, and wherein said determining step comprises:

for each print pixel location, summing a number of ON bits in the color separations;

setting a corresponding first bit in a resultant image bitmap comprised of multiple color separations each defined by a bitmap of multiple-bit pixels arranged in an array of scan lines ON if a corresponding first bit in said color separation bitmap is ON;

setting a corresponding second bit in said resultant image bitmap to one of ON or OFF to represent the printing of said large dot size or said small dot size when said sum for said print pixel location is equal to or less than a predetermined value; and setting said corresponding second bit in said resultant image bitmap to one of ON or OFF to represent the printing of said large dot size or said small dot size when said sum for said print pixel location is greater than said predetermined value, provided that at least one dot at said print pixel location is printed as said small dot size.

2. The method of claim 1, wherein said color image is printed such that only said large dot size is printed at said print pixel if only a single color is printed at said pixel, and only said small dot size is printed at said print pixel if more than one color is printed at said pixel.

3. The method of claim 1, wherein said printer prints from 2 to 10 different drop sizes at any given print pixel.

4. The method of claim 3, wherein said printer prints 2 different drop sizes at any given print pixel.

5. The method of claim 4, wherein said small drop size is larger than ½ the diameter of said large dot size.

6. The method of claim 1, wherein said determining step is conducted electronically in said printer on a pixel-by-pixel basis concurrent with said printing step.

7. The method of claim 1, wherein said predetermined value is one.

8. The method of claim 1, further comprising halftoning said color image prior to said determining step.

9. The method of claim 1, wherein said printing step comprises ejecting ink droplets from an ink jet printhead in response to a signal received from a controller, said signal comprising a first signal indicating whether an ink droplet should be ejected and a second signal indicating a size of said ink droplet.

10. An apparatus for processing a color image for printing to reduce an amount of marking material used therefor, comprising:

a printer for printing multiple dot sizes at any given print pixel, said multiple dot sizes comprising at least a large dot size and a small dot size smaller than said large dot size;

means for determining if marking material for multiple colors of said color image are to be printed at said print pixel; and means for printing said color image with a combination of said large dot size and said small dot size, wherein either of said large dot size and said small dot size is printed at said print pixel if only a single color is printed at said pixel, and at least one of said small dot size is printed at said print pixel if more than one color is printed at said pixel, wherein said determining means comprises an ink coverage determination device comprising:

input means for accepting said color image comprised of multiple color separations each defined by a bitmap of single bit pixels each having a pixel value and arranged in an array of scan lines;

calculation means for summing, for each print pixel location, a number of ON bits in the color separations, setting a corresponding first bit in a resultant image bitmap comprised of multiple color separations each defined by a bitmap of two-bit pixels arranged in an array of scan lines ON if a corresponding bit in said color separation bitmap is ON, setting a corresponding second bit in said resultant image bitmap to one of ON or OFF to represent the printing of said large dot size or said small dot size when said sum for said print pixel location is less than or equal to a predetermined value, and setting said corresponding second bit in said resultant image bitmap to one of ON or OFF to represent the printing of said large dot size or said small dot size when said sum for said print pixel location is greater than said predetermined value, provided that at least one dot at said print pixel location is printed as said small dot size; and output means for outputting said resultant image bitmap to said printing means.

11. The apparatus of claim 10, wherein said predetermined value is one.

12. The apparatus of claim 10, wherein said apparatus is selected from the group consisting of an ink jet printer, an electrophotographic printer, and an ionographic printer.

13. The apparatus of claim 10, wherein said means for printing comprises an ink jet printhead and a controller, said printhead ejecting ink droplets therefrom in response to a signal received from said controller, said signal comprising a first signal indicating whether an ink droplet should be ejected and a second signal indicating a size of said ink droplet.

14. The apparatus of claim 10, wherein said printing means prints said color image such that only said large dot size is printed at said print pixel if only a single color is printed at said pixel, and only said small dot size is printed at said print pixel if more than one color is printed at said pixel.

15. The apparatus of claim 14, wherein said means for printing comprises an ink jet printhead having a first set of nozzles for ejecting droplets of ink of said large dot size and a second set of nozzles for ejecting droplets of ink of said small dot size.

16. The apparatus of claim 10, wherein said means for printing comprises an ink jet printhead having a plurality of nozzles selectively eject droplets of ink of said large dot size and of said small dot size.

17. The apparatus of claim 10, wherein said small dot size is larger than ½ the diameter of said large dot size.

18. The apparatus of claim 10, further comprising means for halftoning said color image.

19. A method for processing a color image for printing to reduce an amount of marking material used therefor, comprising:

providing a printer for printing multiple dot sizes at any given print pixel, said multiple dot sizes comprising at least a large dot size and a small dot size smaller than said large dot size;

determining if marking material for multiple colors of said color image are to be printed at said print pixel; and printing said color image with a combination of said large dot size and said small dot size, wherein either of said large dot size and said small dot size is printed at said print pixel if only a single color is printed at said pixel, and at least one of said small dot size is printed at said print pixel if more than one color is printed at said pixel, wherein said color image is comprised of multiple color separations each defined by a bitmap of multiple bit pixels each having a pixel value and arranged in an array of scan lines, wherein said multiple bit pixels comprise a first bit pixel defining an ON or OFF state of the pixel and a second bit pixel defining a printed dot size of the pixel, and wherein said determining step comprises:

for each print pixel location, summing a number of ON bits in the color separations;

setting a corresponding first bit in a resultant image bitmap comprised of multiple color separations each defined by a bitmap of multiple-bit pixels arranged in an array of scan lines ON if a corresponding first bit in said color separation bitmap is ON;

setting a corresponding second bit in said resultant image bitmap to one of ON or OFF to represent the printing of said large dot size or said small dot size when said sum for said print pixel location is equal to or less than a predetermined value; and setting said corresponding second bit in said resultant image bitmap to one of ON or OFF to represent the printing of said large dot size or said small dot size when said sum for said print pixel location is greater than said predetermined value, provided that at least one dot at said print pixel location is printed as said small dot size.

20. The method of claim 19, wherein said color image is printed such that only said large dot size is printed at said print pixel if only a single color is printed at said pixel, and only said small dot size is printed at said print pixel if more than one color is printed at said pixel.

21. The method of claim 19, wherein said printer can print from 2 to 10 different drop sizes at any given print pixel.

22. The method of claim 21, wherein said printer can print 2 different drop sizes at any given print pixel.

23. The method of claim 22, wherein said small drop size is larger than ½ the diameter of said large dot size.

24. The method of claim 19, wherein said determining step is conducted electronically in said printer on a pixel-by-pixel basis concurrent with said printing step.

25. The method of claim 19, wherein said summing step further comprises weighting said sum based on the specified printed dot size of the second bit pixel of the multiple color separation bitmaps, such that a large dot size has a greater value than that of said small dot size.

26. The method of claim 19, further comprising halftoning said color image prior to said determining step.

27. The method of claim 19, wherein said printing step comprises ejecting ink droplets from an ink jet printhead in response to a signal received from a controller, said signal comprising a first signal indicating whether an ink droplet should be ejected and a second signal indicating a size of said ink droplet.

28. An apparatus for processing a color image for printing to reduce an amount of marking material used therefor, comprising:

a printer for printing multiple dot sizes at any given print pixel, said multiple dot sizes comprising at least a large dot size and a small dot size smaller than said large dot size;

means for determining if marking material for multiple colors of said color image are to be printed at said print pixel; and means for printing said color image with a combination of said large dot size and said small dot size, wherein either of said large dot size and said small dot size is printed at said print pixel if only a single color is printed at said pixel, and at least one of said small dot size is printed at said print pixel if more than one color is printed at said pixel, wherein said determining means comprises an ink coverage determination device comprising:

input means for accepting said color image comprised of multiple color separations each defined by a bitmap of multiple bit pixels each having a pixel value and arranged in an array of scan lines, wherein said multiple bit pixels comprise a first bit pixel defining an ON or OFF state of the pixel and a second bit pixel defining a printed dot size of the pixel;

calculation means for summing, for each print pixel location, a number of ON bits in the color separations, setting a corresponding first bit in a resultant image bitmap comprised of multiple color separations each defined by a bitmap of multiple bit pixels arranged in an array of scan lines ON if a corresponding bit in said color separation bitmap is ON, setting a corresponding second bit in said resultant image bitmap to a value specified in a corresponding second bit pixel of the multiple color separation bitmaps to represent the printing of said large dot size or said small dot size when said sum for said print pixel location is less than or equal to a predetermined value, and setting said corresponding second bit in said resultant image bitmap to one of ON or OFF to represent the printing of said large dot size or said small dot size when said sum for said print pixel location is greater than said predetermined value, provided that at least one dot at said print pixel location is printed as said small dot size; and output means for outputting said resultant image bitmap to said printing means.

29. The apparatus of claim 28, wherein said printing means prints said color image such that only said large dot size is printed at said print pixel if only a single color is printed at said pixel, and only said small dot size is printed at said print pixel if more than one color is printed at said pixel.

30. The apparatus of claim 29, wherein said means for printing comprises an ink jet printhead having a first set of nozzles for ejecting droplets of ink of said large dot size and a second set of nozzles for ejecting droplets of ink of said small dot size.

31. The apparatus of claim 28, wherein said means for printing comprises an ink jet printhead having a plurality of nozzles that can selectively eject droplets of ink of said large dot size and of said small dot size.

32. The apparatus of claim 28, wherein said small dot size is larger than ½ the diameter of said large dot size.

33. The apparatus of claim 28, further comprising means for halftoning said color image.

34. The apparatus of claim 28, wherein said calculation means provides a weighted sum based on the specified printed dot size of the second bit pixel of the multiple color separation bitmaps, such that a large dot size has a greater value than that of said small dot size.

35. The apparatus of claim 28, wherein said apparatus is selected from the group consisting of an ink jet printer, an electrophotographic printer, and an ionographic printer.

36. The apparatus of claim 28, wherein said means for printing comprises an ink jet printhead and a controller, said printhead ejecting ink droplets therefrom in response to a signal received from said controller, said signal comprising a first signal indicating whether an ink droplet should be ejected and a second signal indicating a size of said ink droplet.

* * * * *